(12) United States Patent
Dalton et al.

(10) Patent No.: US 8,537,273 B2
(45) Date of Patent: Sep. 17, 2013

(54) DEMO DOCK FOR DIGITAL CAMERAS

(75) Inventors: Dan L. Dalton, Greeley, CO (US); Wilfred F. Brake, Ft. Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1833 days.

(21) Appl. No.: 11/260,354

(22) Filed: Oct. 27, 2005

(65) Prior Publication Data

US 2007/0097255 A1    May 3, 2007

(51) Int. Cl.
*H04N 5/225* (2006.01)
*H04N 5/222* (2006.01)
*G03B 17/02* (2006.01)

(52) U.S. Cl.
USPC ...... 348/373; 348/374; 348/375; 348/333.02; 348/207.1; 396/535

(58) Field of Classification Search
USPC ............... 348/207, 373–376, 207.1, 333.01, 348/333.02, 207.2; 396/535
See application file for complete search history.

(56) References Cited

U.S. PATENT DOCUMENTS

| | | | |
|---|---|---|---|
| 5,745,798 A * | 4/1998 | Hirasawa | 396/51 |
| 6,191,777 B1 * | 2/2001 | Yasuhara et al. | 345/173 |
| 6,549,304 B1 * | 4/2003 | Dow et al. | 358/473 |
| 7,119,835 B2 * | 10/2006 | Gennetten et al. | 348/207.2 |
| 7,158,175 B2 * | 1/2007 | Belz et al. | 348/231.3 |
| 7,259,793 B2 * | 8/2007 | Manico et al. | 348/373 |
| 2002/0033881 A1 * | 3/2002 | Kindaichi | 348/64 |
| 2003/0095291 A1 * | 5/2003 | Dow et al. | 358/473 |
| 2003/0117521 A1 * | 6/2003 | Nagaoka | 348/373 |
| 2003/0214602 A1 * | 11/2003 | Battles et al. | 348/375 |
| 2004/0041933 A1 * | 3/2004 | Fredlund et al. | 348/333.01 |
| 2004/0070681 A1 * | 4/2004 | Battles et al. | 348/333.01 |
| 2004/0090528 A1 * | 5/2004 | Miyamoto | 348/207.1 |
| 2004/0105024 A1 * | 6/2004 | Takahashi | 348/333.01 |
| 2004/0212822 A1 * | 10/2004 | Schinner | 358/1.15 |
| 2005/0057683 A1 * | 3/2005 | Terane | 348/372 |
| 2005/0088572 A1 * | 4/2005 | Pandit et al. | 348/375 |
| 2006/0268162 A1 * | 11/2006 | Kayanuma | 348/375 |
| 2008/0056570 A1 * | 3/2008 | Williams et al. | 382/173 |
| 2008/0225124 A1 * | 9/2008 | Schinner et al. | 348/207.99 |

FOREIGN PATENT DOCUMENTS

JP    2003271117 A  *  9/2003

OTHER PUBLICATIONS

Sony Digital Still Camera DSC-F505—Operating Instructions Manual—Sony Corporation (1999).*
The fine art of Advanced technology—Toshibs PDR-M5 camera manual exertions—Easy Expert (1999).*
The fine art of Advanced technology—Toshiba PDR-M4 / PDR-M5 "Demo Mode"—Toshiba America Inc (1999).*

* cited by examiner

*Primary Examiner* — Nhan T Tran
*Assistant Examiner* — Marly Camargo

(57) ABSTRACT

When a digital camera detects that it has been placed in a demo dock, it resets internal settings to demo defaults and may launch a point-of-purchase dock demo to attract attention. When a customer removes the camera from the demo dock, an interactive demo may begin. The demo may instruct the customer how to interact with the demo or end it. Once ended, the camera reverts to normal operation until replaced in the demo dock. Methods of using the dock and digital camera are also disclosed.

4 Claims, 3 Drawing Sheets

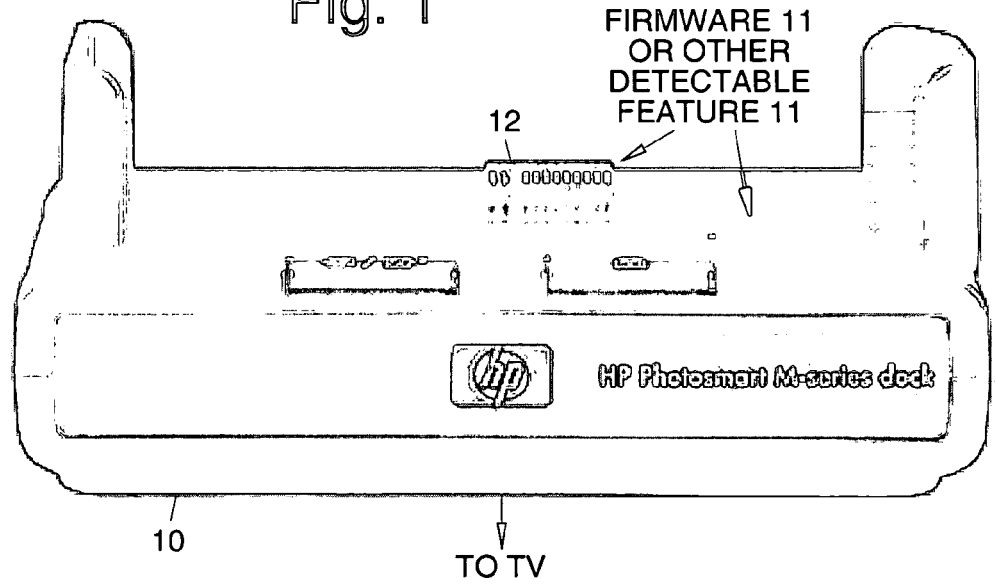
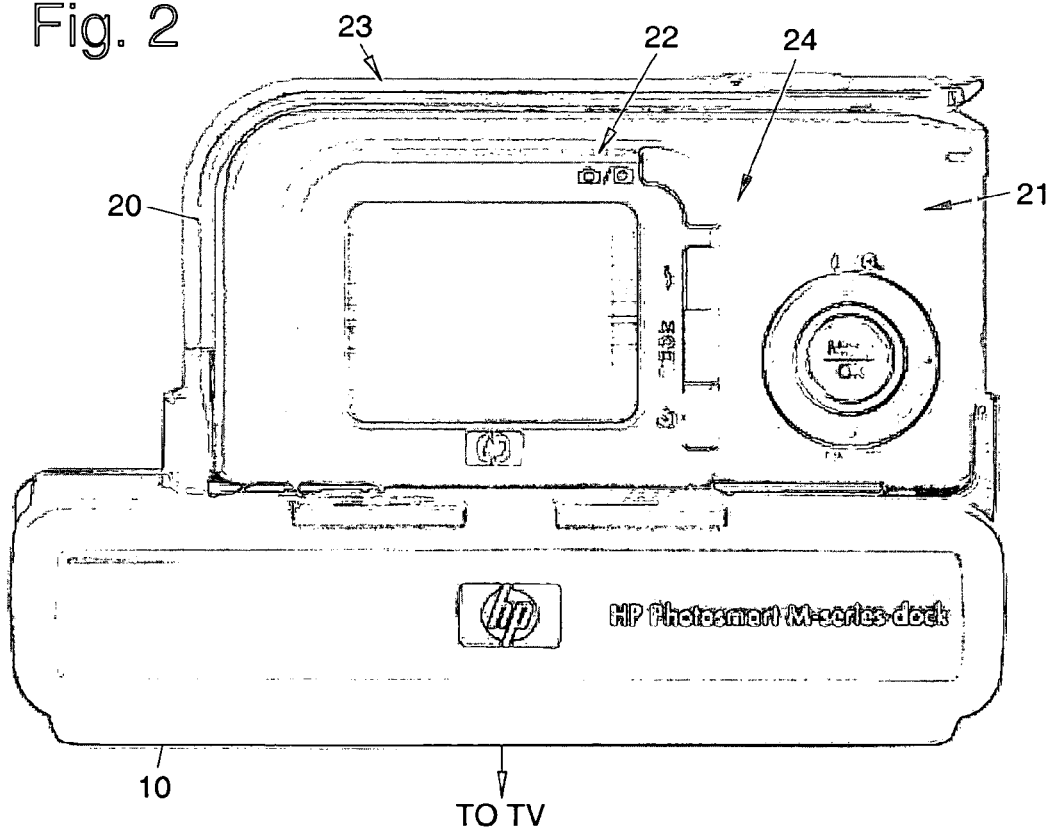

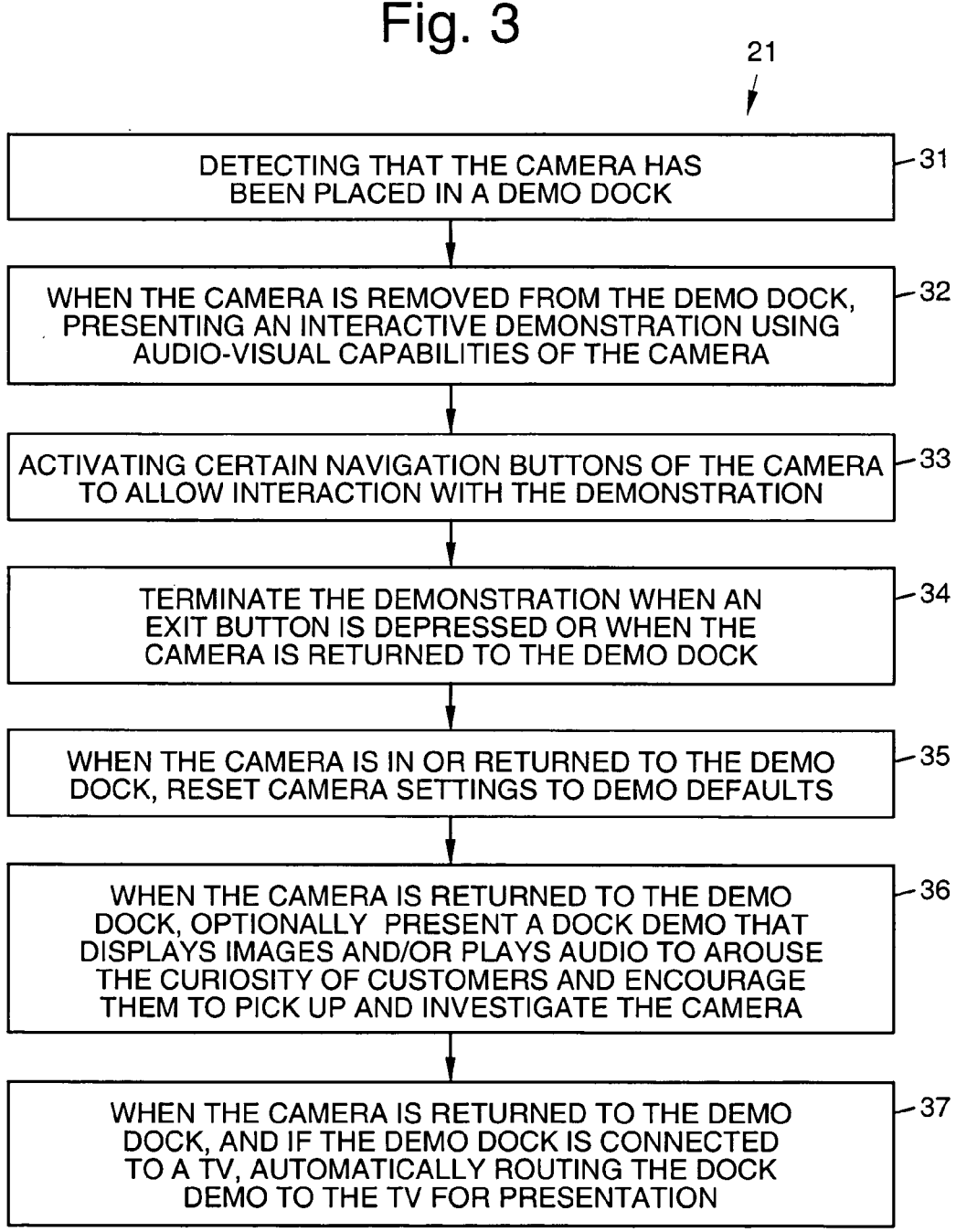

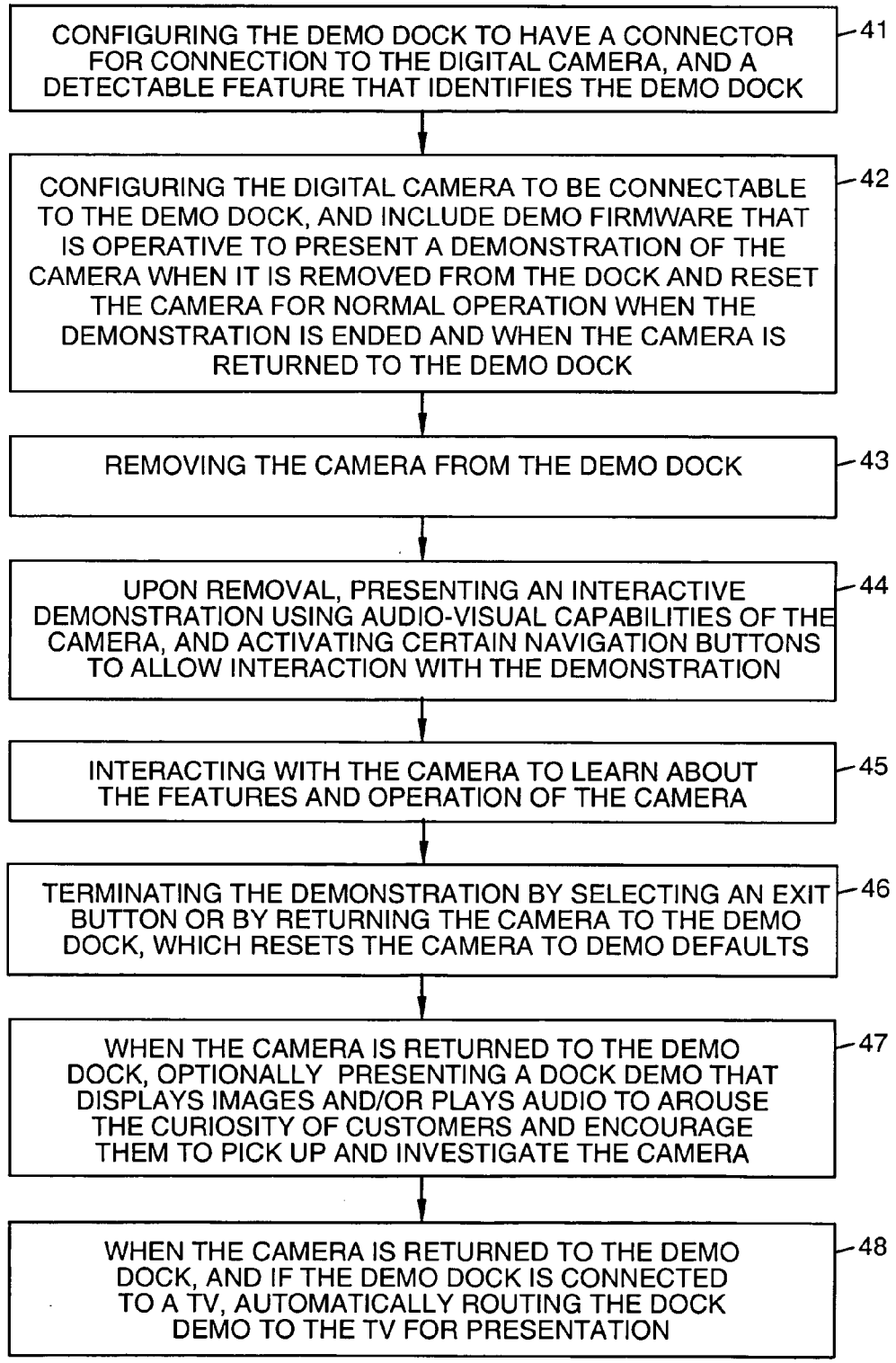

DEMO DOCK FOR DIGITAL CAMERAS

BACKGROUND

Retail stores that sell digital cameras typically display the cameras on a shelf with a short list of features printed next to each camera. However, due to shelf space constraints, the amount of information presented regarding each camera is very limited. Also, there are generally no measures taken to encourage a user to demo the cameras. If an instruction tag is provided indicating to the user how to demonstrate the cameras, it may be lost or deliberately removed (sabotaged).

Many digital cameras can connect to a dock, or docking station, that provides connections to a PC, printer, and/or TV. The dock may also be used to charge the camera's batteries.

It would be desirable to have a camera and dock, or docking station, that permits a customer to interactively demonstrate features of a digital camera without allowing camera settings to be corrupted or sabotaged.

BRIEF DESCRIPTION OF THE DRAWINGS

The various features and advantages of disclosed embodiments may be more readily understood with reference to the following detailed description taken in conjunction with the accompanying drawings, wherein like reference numerals designate like structural elements, and in which:

FIG. 1 illustrates an exemplary demo dock prior to docking of a digital camera;

FIG. 2 illustrates an exemplary demo dock after camera docking;

FIG. 3 is a flow diagram that illustrates operation of exemplary firmware for use with the demo dock and digital camera; and FIG. 4 is a flow diagram that illustrates an exemplary method of using the demo dock and digital camera.

DETAILED DESCRIPTION

Referring to the drawing figures, FIG. 1 illustrates an exemplary demo dock 10, or docking station 10, prior to docking of a digital camera 20 therein, and FIG. 2 illustrates another exemplary embodiment of the demo dock 10 after docking of the digital camera 20. In one embodiment, the demo dock 10 may incorporate dock firmware 11 as a detectable feature 11 that is detectable by the digital camera 20 that is inserted therein or coupled thereto (i.e., docked), identifying that the dock is a demo dock 10. For example, a particular communication protocol used to communicate between the camera 20 and the demo dock 10 may comprise the detectable feature 11.

Alternatively, in other embodiments, any mechanical or electrical feature 11 or characteristic that is detectable by the digital camera 20 may be used to distinguish the demo dock 10 from a normal dock. For example, a special key or protrusion on the demo dock 10 or its electrical connector 12, for example, may be sensed by the camera 20 to identify that it is coupled to a demo dock 10.

When the camera 20 is removed from the demo dock 10, it begins an interactive in-hand customer sales presentation implemented via demo firmware 21 residing in the camera 10 that utilizes its liquid crystal display (LCD) 22 and speaker 23 (generally designated) to inform the user of the various features and benefits of the camera 20. The customer may be encouraged to interact with the demo by pressing selected navigation buttons 24. One or more navigation buttons 24 may also be designated as an exit button 24. Pressing an exit button 24 terminates the demo and causes the camera 20 to revert to factory settings defining normal operation.

When the camera 20 is placed back into the demo dock 10, the firmware 21 residing therein prepares it for the next demo by resetting camera settings to demo defaults to ensure that the camera 20 does not remain in a nonstandard state that could be confusing to other customers. This resetting action also defeats deliberate attempts at camera sabotage. The camera 20 may also erase some of the oldest pictures stored in its memory, if necessary, to guarantee that there is always sufficient space for the next user to take several pictures. After resetting itself, the camera 20 would then start a dock demo by displaying images and/or playing audio designed to arouse the curiosity of customers walking by and encourage them to pick up and investigate the camera 20.

The camera 20 may be reset any time after it is placed in the demo dock 10 until the time the user exits demo mode. For example, the camera 20 may be reset when it is first placed in the dock 10, or when it is removed from the dock 10, or when the user exits demo mode.

If the demo dock 10 is connected to a TV, for example, the dock demo implemented by the demo firmware 21 may be automatically routed to the TV screen, rather than requiring the user to press a TV button 24 as is the case for a normal dock. This allows retailers to painlessly set up a point-of-purchase demo on a large display screen that would draw much more attention and be easier to read than a demo running on the liquid crystal display 22 of the camera 20.

It is desirable that it not be too hard for a retailer or customer to put a camera 20 into demo mode or it is not likely to happen. The above-described demo dock 10 provides a simple way to put the camera 20 into demo mode without affecting normal operation of the camera 20.

It is not desirable to have every camera 20 default to demo mode or customers may have problems getting it out of demo mode after purchase. This is not an issue with the demo dock 10, because customers will not be able to buy the demo dock 10, so they will never see the demo mode at home.

It is not desirable to have the camera 20 left in a nonstandard or confusing state after a customer has played with it. Every time the camera 20 is placed into the demo dock 10, it resets itself to demo defaults. This also overcomes deliberate attempts at sabotage.

Cameras 20 on display at retail stores typically sit idly sleeping on a shelf until a user picks them up and turns them on. When a camera 20 detects that it is sitting on a demo dock 10 it may be configured to automatically launch a dock demo on its liquid crystal display 22, or on a connected TV, to attract attention.

FIG. 3 is a flow diagram that illustrates operation of exemplary firmware 21 for use with the demo 10 dock and the digital camera 20. Actions implemented by the exemplary firmware 21 are as follows.

The firmware 21 detects 31 that the camera 20 has been placed in a demo dock 10. When the camera 20 is removed from the demo dock 10, the firmware 21 presents 32 an interactive demonstration using audio-visual capabilities of the camera 20. The firmware 21 activates 33 certain navigation buttons 24 of the camera 20 to allow interaction with the demonstration. The firmware 21 terminates 34 the demonstration when an exit button 24 is depressed or when the camera 20 is returned to the demo dock 10. When the camera 20 is in or returned to the demo dock 10, the firmware 21 resets 35 camera settings to demo defaults. When the camera 20 is returned to the demo dock 10, the firmware 21 may optionally present 36 a dock demo that displays images and/or plays audio to arouse the curiosity of customers and encourage them to pick up and investigate the camera 20. Also, when the camera 20 is returned to the demo dock 10, and if the demo dock 10 is connected to a TV, the dock demo may be automatically routed 37 to the TV for presentation.

FIG. 4 is a flow diagram that illustrates an exemplary method 40 of using the demo dock 10 and the digital camera 20. The demo dock 10 is configured 41 to have a dock connector 12 for connection to the digital camera 20, and a detectable feature 11 that identifies the demo dock 10. The digital camera 20 is configured 42 to be connectable to the demo dock 10 and include demo firmware 21 that is operative to present a demonstration of the camera 20 when it is removed from the dock 10 and reset the camera 20 for normal operation when the demonstration is ended.

The camera 20 is removed 43 from the demo dock 10. Upon removal, the firmware 21 presents 44 an interactive demonstration using audio-visual capabilities of the camera 20, and activates certain navigation buttons 24 to allow interaction with the demonstration. The customer interacts 45 with the camera 20 to learn about the features and operation of the camera 20. The customer terminates 46 the demonstration by selecting an exit button 24, which resets the camera 20 to demo defaults.

When the camera 20 is in the demo dock 10, the firmware 21 may be made operative to present 47 a dock demo that displays images and/or plays audio to arouse the curiosity of customers and encourage them to pick up and investigate the camera 20. Also, when the camera 20 is in the demo dock 10, and the demo dock 10 is connected to a TV, the dock demo may be automatically routed 48 to the TV for presentation.

Thus, a demo dock and related methods and algorithms that provide for a point-of-purchase dock demo to attract attention have been disclosed. It is to be understood that the above-described embodiments are merely illustrative of some of the many specific embodiments that represent applications of the principles described herein. Clearly, numerous and other arrangements can be readily devised by those skilled in the art without departing from the scope of the invention.

What is claimed is:

1. A method comprising: configuring a demo dock to have a connector for connection to a digital camera, and a detectable feature that identifies the demo dock configuring the digital camera to be connectable to the demo dock and include demo firmware that is operative to begin an interactive demonstration of the camera in response to the removal of the camera from the dock and reset the camera for normal operation when the demonstration is ended and when the camera is returned to the demo dock; removing the camera from the demo dock; upon removal, presenting an interactive demonstration using audio-visual capabilities of the camera, and activating certain navigation buttons of the camera to allow interaction with the demonstration; interacting with the camera to learn about the features and operation of the camera; and terminating the demonstration by selecting an exit button or returning the camera to the demo dock, which resets the camera to demo defaults.

2. The method recited in claim 1 wherein, when the camera is in the demo dock, presenting a dock demo on the camera that displays images and/or plays audio to arouse the curiosity of customers and encourage them to pick up and investigate the camera.

3. The method recited in claim 1 wherein, when the camera is in the demo dock, and the demo dock is connected to a TV, automatically routing the dock demo to the TV for presentation.

4. The method recited in claim 1, wherein the presenting an interactive demonstration comprises automatically presenting the interactive demonstration.

\* \* \* \* \*